F. F. HUGHES.
FUEL MIXER.
APPLICATION FILED SEPT. 28, 1920.
1,398,899.
Patented Nov. 29, 1921.
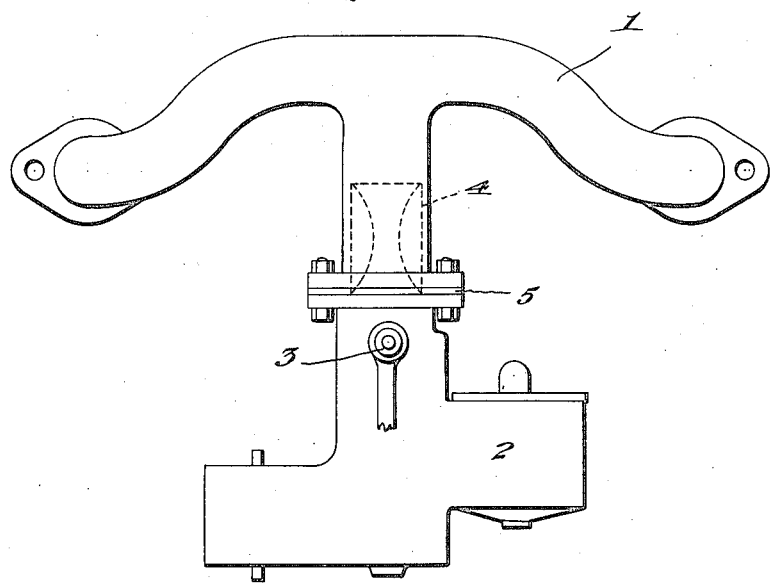
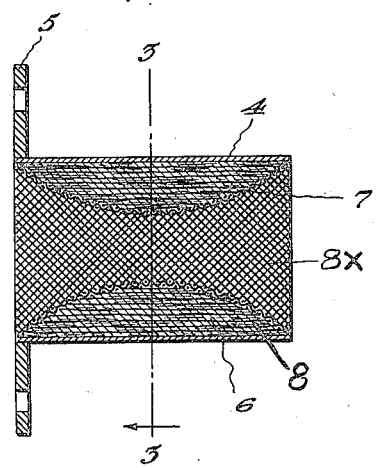
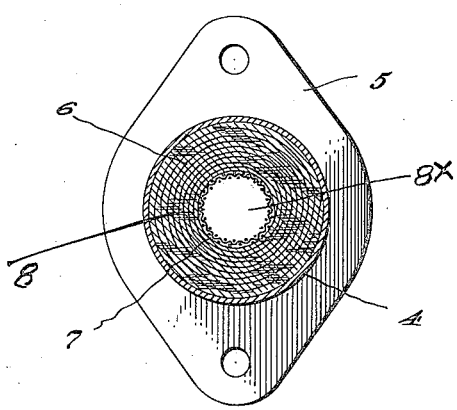
F. F. Hughes
INVENTOR
BY Victor J. Evans
ATTORNEY
WITNESS

UNITED STATES PATENT OFFICE.

FRANCIS F. HUGHES, OF ATLANTA, GEORGIA.

FUEL-MIXER.

1,398,899.  Specification of Letters Patent.  Patented Nov. 29, 1921.

Application filed September 28, 1920.  Serial No. 413,331.

*To all whom it may concern:*

Be it known that I, FRANCIS F. HUGHES, a citizen of the United States, residing at Atlanta, in the county of Fulton and State of Georgia, have invented new and useful Improvements in Fuel-Mixers, of which the following is a specification.

My present invention has for its object the provision of simple and efficient means to improve the combustible quality of explosive mixture *en route* between the carbureter and the intake manifold of an internal combustion engine, with a view to contributing to economy in the consumption of gasolene.

To the attainment of the foregoing the invention consists in the improvement as hereinafter described and definitely claimed.

In the accompanying drawings, hereby made a part hereof:—

Figure 1 is a view illustrating the arrangement of my improvement relatively to the carbureter and the intake manifold of an internal combustion engine.

Fig. 2 is a longitudinal diametrical section of my novel device *per se*.

Fig. 3 is a transverse section taken in the plane indicated by the line 3—3 of Fig. 2.

Similar numerals of reference designate corresponding parts in all of the views of the drawings.

In Fig. 1 I show the intake manifold 1 of an internal combustion engine and a carbureter 2, and in the preferred application of my invention my novel vaporizing device is arranged intermediate of the usual throttle valve 3 and the intake manifold 1.

My novel device comprises a cylindrical shell 4 having an apertured flange 5, and a gasolene absorbing device 6 arranged in the shell 4. The said device includes a frame 7 of reticulated material, and an absorbent covering 8 on said frame and interposed between the same and the wall of the shell 4; the said absorbent covering or filling 8 being formed of felt, textile material or other material possessed of sufficient absorbing capacity. The device 6 is contracted at an intermediate point of its length as illustrated so that the passage 8$^x$ between the same is of the general configuration of a Venturi tube.

In the practical application of my improvement the shell 4 is slipped into the induction portion of the manifold 1, and its flange 5 is interposed between and bolted to flanges on the intake manifold and on the conduit that extends from the carbureter 2.

It is well known that after leaving the carbureter gasolene is frequently in the form of globules. These globules are absorbed by the absorbent covering or filling 8, and in consequence when air passes through the shell 4 *en route* to the intake manifold, the air will effectively vaporize the gasolene in the absorbent covering or filling 8 and will carry the same intimately mixed with the air to the internal combustion engine with the result that the mixture supplied to the engine will be highly combustible, and waste of gasolene will be precluded.

Having described my invention, what I claim and desire to secure by Letters-Patent, is:

1. The combination with a carbureter and the intake manifold of an internal combustion engine, of auxiliary vaporizing means disposed in the conduit connection between the carbureter and the manifold and including an open work frame contracted at an intermediate point of its length to give it the shape of a Venturi tube and an absorbent covering on and about the said frame.

2. A device for the purpose described comprising a cylindrical shell, and an element arranged in said shell and having a contracted intermediate portion, whereby a passage is formed through the element of the shape of a Venturi tube, said element being provided with means to absorb gasolene and to impregnate passing air with the same.

3. A device for the purpose described comprising a cylindrical shell and element arranged in said shell and having a contracted intermediate portion, whereby a passage is formed through the element of the shape of a Venturi tube, said element including a frame of reticulated material, and an absorbent covering on said frame.

In testimony whereof I affix my signature.

FRANCIS F. HUGHES.